(12) United States Patent
Wang et al.

(10) Patent No.: US 9,455,475 B2
(45) Date of Patent: Sep. 27, 2016

(54) ELECTROLYTE COMPOSITION AND LITHIUM BATTERY

(71) Applicant: National Taiwan University of Science and Technology, Taipei (TW)

(72) Inventors: Fu-Ming Wang, Hsinchu (TW); Sylvia Ayu Pradanawati, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 226 days.

(21) Appl. No.: 14/287,048

(22) Filed: May 25, 2014

(65) Prior Publication Data

US 2015/0147632 A1 May 28, 2015

(30) Foreign Application Priority Data

Nov. 28, 2013 (TW) .............................. 102143493 A

(51) Int. Cl.
*H01M 10/0568* (2010.01)
*H01M 10/052* (2010.01)
*H01M 6/16* (2006.01)

(52) U.S. Cl.
CPC ......... *H01M 10/0568* (2013.01); *H01M 6/166* (2013.01); *H01M 10/052* (2013.01); *Y02E 60/122* (2013.01)

(58) Field of Classification Search
CPC ......... H01M 10/0568; H01M 10/052; H01M 6/166; Y02E 60/122
See application file for complete search history.

(56) References Cited

U.S. PATENT DOCUMENTS

| 2011/0214895 | A1* | 9/2011 | Ihara .................. H01M 10/056 429/336 |
| 2013/0078533 | A1 | 3/2013 | Kang et al. |
| 2014/0127556 | A1* | 5/2014 | Wang ................ H01M 10/0568 429/163 |

FOREIGN PATENT DOCUMENTS

| CN | 103022558 | 4/2013 |
| EP | 1442489 | 8/2004 |
| EP | 2526105 | 11/2012 |

OTHER PUBLICATIONS

Scheers et al., "Benzimidazole and imidazole lithium salts for battery electrolytes," Journal of Power Sources, vol. 195, Issue 18, Sep. 15, 2010, pp. 6081-6087.
Chen et al., "Novel Polymer Electrolyte Composed of Poly(ethyleneoxide), Lithium Triflate, and Benzimidazole," Journal of Applied Polymer Science, vol. 91, Issue 2, Jan. 15, 2004, pp. 719-725.
"Office Action of Taiwan Counterpart Application", issued on Feb. 13, 2015, p. 1-p. 4.

* cited by examiner

*Primary Examiner* — Laura Weiner
(74) *Attorney, Agent, or Firm* — Jianq Chyun IP Office

(57) ABSTRACT

An electrolyte composition including a lithium salt (A), an first anion (B1) represented by formula (1), and an organic solvent (C) are provided. When the electrolyte composition is applied in a lithium battery, good structural stability, high battery efficiency, and long charge-discharge cycle life of the lithium battery can be achieved.

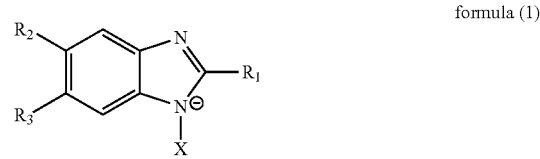

formula (1)

4 Claims, 2 Drawing Sheets

ELECTROLYTE COMPOSITION AND LITHIUM BATTERY

CROSS-REFERENCE TO RELATED APPLICATION

This application claims the priority benefit of Taiwan application serial no. 102143493, filed on Nov. 28, 2013. The entirety of the above-mentioned patent application is hereby incorporated by reference herein and made a part of this specification.

BACKGROUND OF THE INVENTION

1. Field of the Invention

The invention relates to an electrolyte composition, and more particularly, to an electrolyte composition containing a specific anion and a lithium battery using the electrolyte composition.

2. Description of Related Art

In recent years, the market demand for a secondary lithium battery capable of repeatingly charging and discharging and having the features of, for instance, lightweight, high voltage value, and high energy density has rapidly increased. In particular, the lithium battery has very high potential in the application and expandability of light electric vehicles, electric vehicles, and the large power storage industry. As a result, current performance requirements for the lithium battery such as lightweight, durability, high voltage, high energy density, and high safety have also become higher.

In a secondary lithium battery, an electrolyte solution containing lithium hexafluorophosphate ($LiPF_6$), lithium tetrafluoroborate ($LiBF_4$), lithium hexafluoroarsenate ($LiAsF_6$), or lithium hexafluoroantimonate ($LiSbF_6$) is generally used. However, the compounds are readily dissolved at high temperature, thereby producing a Lewis acid. The Lewis acid damages the structures of, for instance, the cathode material, the anode material, the solid electrolyte interface, and the isolation film in the secondary lithium battery, thus causing poor structural stability, performance degradation, and reduced charge-discharge cycle life of the secondary lithium battery. Therefore, how to increase the structural stability of the secondary lithium battery when operating at high temperature is one of the desired goals of those skilled in the art.

SUMMARY OF THE INVENTION

Accordingly, the invention provides an electrolyte composition. A secondary lithium battery using the electrolyte composition can maintain structural stability when operating at high temperature.

The invention provides an electrolyte composition including a lithium salt (A), a first anion (B1) represented by formula (1), and an organic solvent (C).

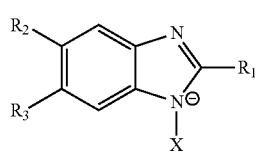

formula (1)

In formula (1), $R_1$, $R_2$, and $R_3$ each independently represent a hydrogen atom, a $C_1$ to $C_6$ alkyl group, a halogen atom, or a trifluoromethyl group ($—CF_3$), and X represents $PF_5$, $BF_3$, $AsF_5$, $SbF_5$, or $SO_2CF_3$.

In an embodiment of the invention, $R_1$, $R_2$, and $R_3$ represent a hydrogen atom.

In an embodiment of the invention, the electrolyte composition further includes a second anion (B2) represented by formula (2),

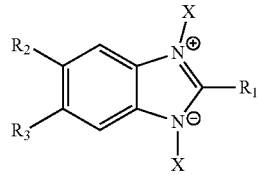

formula (2)

in formula (2), $R_1$, $R_2$, and $R_3$ each independently represent a hydrogen atom, a $C_1$ to $C_6$ alkyl group, a halogen atom, or $—CF_3$, and X represents $PF_5$, $BF_3$, $AsF_5$, $SbF_5$, or $SO_2CF_3$.

In an embodiment of the invention, the lithium salt (A) is lithium hexafluorophosphate.

In an embodiment of the invention, based on a total amount of 100 parts by weight of the organic solvent (C), the usage amount of the lithium salt (A) is 15 parts by weight to 30 parts by weight, and the usage amount of the anion (B) is 12 parts by weight to 29 parts by weight.

The invention further provides a lithium battery including an anode, a cathode, an isolation film, the electrolyte composition above, and a package structure. The cathode and the anode are separately disposed. The isolation film is disposed between the anode and the cathode, and the isolation film, the anode, and the cathode define a housing region. The electrolyte composition is disposed in the housing region. The package structure covers the anode, the cathode, and the electrolyte composition.

Based on the above, the lithium battery fabricated by the electrolyte composition provided by the invention has good structural stability when operating at high temperature. As a result, the lithium battery has high battery efficiency and long charge-discharge cycle life.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following embodiments of the invention, the electrolyte composition of the invention is applied in a secondary lithium battery for illustration. However, the application of the invention is not limited thereto. The electrolyte composition of the invention can also be used in other lithium batteries of different types. Of course, in addition to being used in a lithium battery, the electrolyte composition of the invention can also be applied in various devices, and the invention does not particularly limit the use of the electrolyte composition of the invention.

Figure 1:
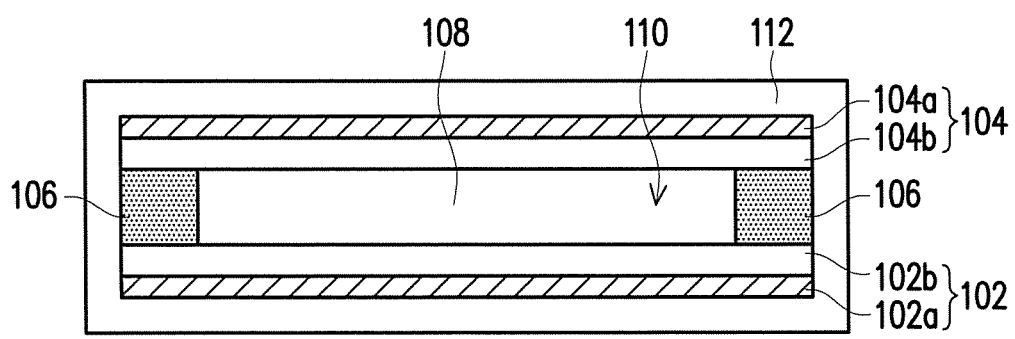
FIG. 1 is a schematic cross-sectional diagram of a lithium battery according to an embodiment of the invention.

The electrolyte composition of the invention can be applied in various types of lithium batteries. For instance, FIG. 1 is a schematic cross-sectional diagram of a lithium battery according to an embodiment of the invention. By using the electrolyte composition of the invention, a lithium battery can have good structural stability when operating at high temperature. The structure of each part of the lithium battery and the components of the electrolyte composition are described in detail below.

In FIG. 1, a lithium battery 100 includes an anode 102, a cathode 104, an isolation film 106, an electrolyte composition 108, and a package structure 112. The cathode 104 and the anode 102 are separated and parallelly disposed. The isolation film 106 is disposed between the anode 102 and the cathode 104. Specifically, there are, for instance, two isolation films 106 respectively disposed at two ends of the anode 102. As a result, the isolation film 106, the anode 102, and the cathode 104 can define a housing region 110 capable of housing the electrolyte composition 108.

The anode 102 includes an anode metal foil 102a and an anode material 102b, and the anode material 102b is disposed on the anode metal foil 102a through coating or sputtering. The anode metal foil 102a is, for instance, a copper foil, an aluminum foil, a nickel foil, or a high-conductivity stainless steel foil. The anode material 102b is, for instance, carbide or metal lithium. The carbide used as the anode material 102b is, for instance, carbon powder, graphite, carbon fiber, carbon nanotube, graphene, or a mixture of the carbides.

The cathode 104 includes a cathode metal foil 104a and a cathode material 104b, and the cathode material 104b is disposed on the cathode metal foil 104a through coating or sputtering. The cathode metal foil 104a is, for instance, a copper foil, an aluminum foil, a nickel foil, or a high-conductivity stainless steel foil. The cathode material 104b includes a lithium mixed transition metal oxide. The lithium mixed transition metal oxide is, for instance, $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}CO_{1/3}Ni_{1/3}O_2$, $LiMc_{0.5}Mn_{1.5}O_4$, or a combination thereof, wherein 0<x<1 and Mc is a divalent metal.

The lithium battery 100 can further include a polymer binder, wherein the polymer binder reacts with the anode 102 and/or the cathode 104 to increase the mechanical properties of the electrode(s). Specifically, the anode material 102b can be adhered to the anode metal foil 102a through the polymer binder, and the cathode material 104b can be adhered to the cathode metal foil 104a through the polymer binder. The polymer binder is, for instance, polyvinylidene difluoride (PVDF), styrene-butadiene rubber (SBR), polyamide, melamine resin, or a combination of the compounds.

The material of the isolation film 106 is, for instance, an insulating material, and the insulating material can be polyethylene (PE), polypropylene (PP), or a multilayer composite structure of the materials, such as PE/PP/PE.

The package structure 112 is used to cover the anode 102, the cathode 104, and the electrolyte composition 108. The material of the package structure 112 is, for instance, aluminum foil.

The electrolyte composition 108 is the electrolyte composition of the invention. The electrolyte composition of the invention and a preparation method thereof are further described in the following.

Specifically, the electrolyte composition 108 applied in the lithium battery 100 includes a lithium salt (A), a benzimidazole compound (BP), and an organic solvent (C). When needed, the electrolyte composition 108 can further include an additive (D).

The lithium salt (A) is, for instance, $LiPF_6$, $LiBF_4$, $LiAsF_6$, $LiSbF_6$, $LiC(SO_2CF_3)_3$, $LiN(SO_2CF_3)_2$, or a combination thereof.

When the lithium salt (A) is lithium hexafluorophosphate ($LiPF_6$) as shown in equation (I), lithium hexafluorophosphate is dissociated into a lithium ion ($Li^+$) and hexafluorophosphate ($PF_6^-$) to release the lithium ion used as a conductive ion. However, as shown in equation (II), a portion of the lithium hexafluorophosphate is reacted in a side reaction, thereby producing Lewis acid phosphorus pentafluoride ($PF_5$). Phosphorus pentafluoride reacts with the cathode material and the isolation film in the lithium battery, thereby damaging the structure of each of the cathode material and the isolation film. Therefore, poor structural stability, performance degradation, and reduced charge-discharge cycle life of the lithium battery result. Of course, using other lithium salts such as $LiBF_4$, $LiAsF_6$, and $LiSbF_6$ also results in a side reaction, thereby producing a Lewis acid such as $BF_3$, $AsF_5$, or $SbF_5$ damaging the structure of each of the cathode material and the isolation film.

$$LiPF_6 \rightarrow Li^+ + PF_6^- \qquad \text{equation (I)}$$

$$LiPF_6 \rightarrow LiF + PF_5 \qquad \text{equation (II)}$$

Accordingly, the benzimidazole compound (BP) is used in the electrolyte composition of the invention. Specifically, as shown in equation (III), the benzimidazole compound (BP) is a salt formed by a benzimidazole derivative and a lithium ion, wherein $R_1$, $R_2$, and $R_3$ each independently represent, for instance, a hydrogen atom, a $C_1$ to $C_6$ alkyl group, a halogen atom, or $-CF_3$, and preferably represent a hydrogen atom. X represents a Lewis acid such as $PF_5$, $BF_3$, $AsF_5$, $SbF_5$, or $SO_2CF_3$.

The benzimidazole compound (BP) can be a Lewis base and be reacted with a Lewis acid via a Lewis acid-base reaction to produce an anion (B), wherein the anion (B) includes a first anion (B1) represented by formula (1), a second anion (B2) represented by formula (2), or a combination of the two.

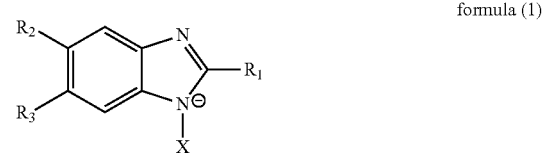

formula (1)

In formula (1), $R_1$, $R_2$, and $R_3$ each independently represent, for instance, a hydrogen atom, a $C_1$ to $C_6$ alkyl group, a halogen atom, or —$CF_3$, and X represents $PF_5$, $BF_3$, $AsF_5$, $SbF_5$, or $SO_2CF_3$.

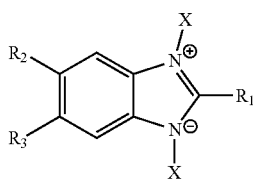

formula (2)

In formula (2), $R_1$, $R_2$, and $R_3$ each independently represent a hydrogen atom, a $C_1$ to $C_6$ alkyl group, a halogen atom, or —$CF_3$, and X represents $PF_5$, $BF_3$, $AsF_5$, $SbF_5$, or $SO_2CF_3$.

The reaction pathway of the Lewis acid-base reaction is as shown in equation (III) and equation (IV). Referring to equation (III), the benzimidazole compound (BP) can be a Lewis base, and be reacted with a Lewis acid via a Lewis acid-base reaction, thus producing an anion (B1) represented by equation (I). Of course, as shown in equation (IV), a nitrogen not connected to a Lewis acid in the first anion (B1) represented by formula (1) can also be further reacted with other Lewis acids to produce the second anion (B2) represented by formula (2). In other words, the benzimidazole compound (BP) can react with one Lewis acid, and can also react with two Lewis acids to form the anion represented by formula (1) or formula (2). Based on the above, the benzimidazole compound (BP) can capture a Lewis acid to prevent damage to the structure of each of the cathode material and the isolation film from the Lewis acid. Therefore, the structural stability of the lithium battery can be better, thus preventing the issues of performance degradation and reduced charge-discharge life cycle of the lithium battery.

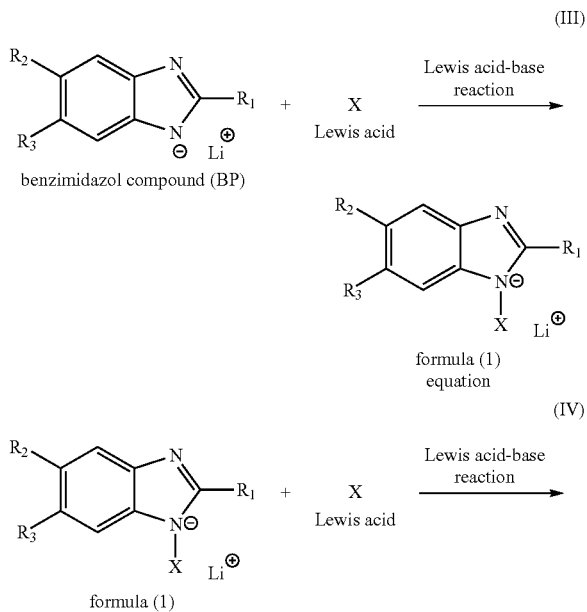

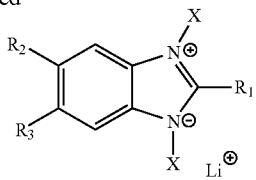

formula (2) equation

Moreover, the method of applying the benzimidazole compound (BP) in a lithium battery is very simple. Specifically, the benzimidazole compound (BP) can be directly added to an electrolyte solution containing the lithium salt (A) and the organic solvent (C) to produce the first anion (B1) represented by formula (1). Therefore, the benzimidazole compound (BP) can be used with an existing lithium battery, and directly improve the lithium battery without changing any battery design, electrode material, and electrolyte solution. Moreover, in the case that lithium hexafluorophosphate ($LiPF_6$) is used as the lithium salt (A), after the benzimidazole compound (BP) is added to the electrolyte solution containing the lithium salt (A) and the organic solvent (C), an electrolyte composition containing a lithium ion ($Li^+$), hexafluorophosphate ($PF_6^-$), and the first anion (B1) represented by formula (1) can be formed.

Based on a total amount of 100 parts by weight of the organic solvent (C) described in the following, the usage amount of the lithium salt (A) is 15 parts by weight to 30 parts by weight, preferably 20 parts by weight to 30 parts by weight; and the usage amount of the anion (B) is 12 parts by weight to 29 parts by weight, preferably 13 parts by weight to 28 parts by weight.

The organic solvent (C) is, for instance, γ-butyrolactone, ethylene carbonate (EC), propylene carbonate, diethyl carbonate (DEC), propyl acetate (PA), dimethyl carbonate (DMC), ethylmethyl carbonate (EMC), or a combination thereof.

The additive (D) is, for instance, mono-maleimide, polymaleimide, bismaleimide, polybismaleimide, a copolymer of bismaleimide and mono-maleimide, vinylene carbonate (VC), or a mixture thereof. The mono-maleimide is, for instance, selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimide, and 2,6-xylylmaleimide. The bismaleimide can have the structure represented by formula (2) above.

Based on a total amount of 100 parts by weight of the organic solvent (C), the usage amount of the additive (D) is 0.1 parts by weight to 5 parts by weight, preferably 0.1 parts by weight to 2 parts by weight.

In the following, the characteristics of the lithium battery provided in the embodiments above are described in detail with experimental examples.

Example 1

Preparation of Anode 93 parts by weight of graphite, 2 parts by weight of carbon black, and 6 parts by weight of polyvinylidene fluoride (PVDF) were dispersed in N-methyl pyrrolidinone (NMP) to form a slurry. Then, the slurry was coated on a copper foil, and steps such as drying, compression, and trimming were performed to form an anode.

Preparation of Cathode 90 parts by weight of $LiCoO_2$, 5 parts by weight of PVDF, and 5 parts by weight of acetylene black (conductive powder) were evenly mixed in NMP (solvent) to form a cathode material. Then, after the material was coated on an aluminum foil, steps such as drying, compression, and trimming were performed to form a cathode.

Preparation of Electrolyte Composition 2 parts by volume of propylene carbonate (PC), 3 parts by volume of ethylene carbonate (EC), and 5 parts by volume of diethyl carbonate (DEC) mixed as the organic solvent in the electrolyte solution, $LiPF_6$ having a concentration of 1 M used as the lithium salt, and 0.1 parts by weight of 0.2 M lithium benzimidazole were used to form the electrolyte composition of example 1.

Fabrication of Lithium Battery

After PP was used as the isolation film to isolate the anode and the cathode and the housing region was defined, the electrolyte composition above was added in the housing region between the anode and the cathode. Lastly, the above structure was sealed with the package structure to complete the fabrication of the lithium battery of example 1. The obtained lithium battery was evaluated by each of the following evaluation methods, and the results thereof are as shown in Table 1, FIG. 2, and FIG. 3.

Comparative Example

The lithium battery of comparative example 1 was fabricated with the same steps as example 1, and the difference thereof is: the electrolyte composition of comparative example 1 does not contain lithium benzimidazole. The obtained lithium battery was evaluated by each of the following evaluation methods, and the results thereof are as shown in Table 1, FIG. 2, and FIG. 3.

<Electrical Measurements>

Charge-Discharge Performance Test

Figure 2:
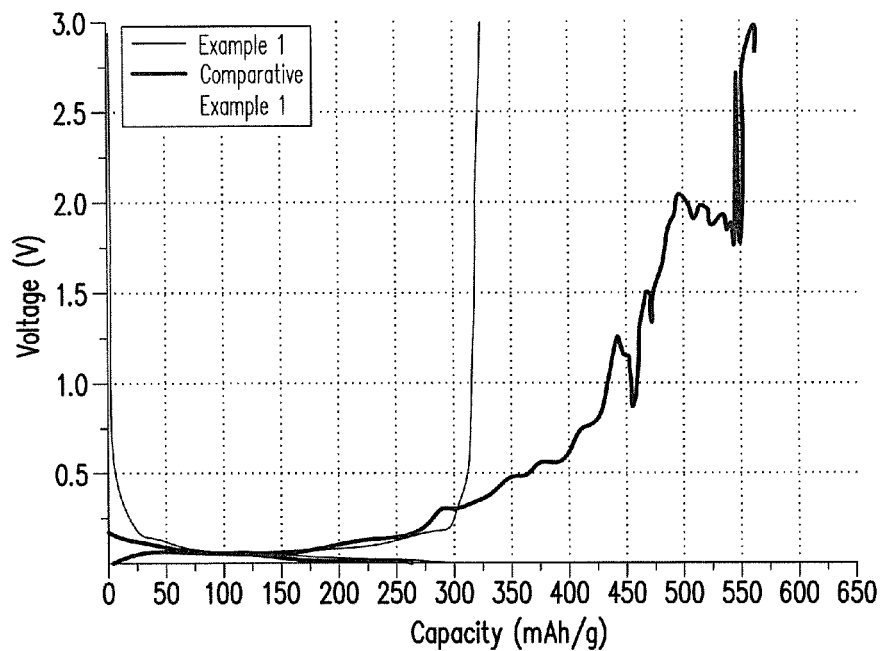
FIG. 2 illustrates a relationship diagram of the charge-discharge of a cation half-cell of a lithium battery of each of example 1 and comparative example 1 of the invention at a temperature of 55° C.

The lithium battery of each of example 1 and comparative example 1 was respectively charged and discharged with a constant current/voltage at room temperature and 55° C. First, the batteries were charged to 0.01 V with a constant current of 0.2 C until the current was less than or equal to 0.02 C. Then, the batteries were discharged to the cut-off voltage (3 V) with a constant current of 0.2 C. FIG. 2 illustrates a relationship diagram of the charge-discharge of a cation half-cell of a lithium battery of each of example 1 and comparative example 1 of the invention at a temperature of 55° C. Moreover, the battery capacity (milliamp hours per gram, mAh/g) and the irreversibility capacity of the lithium battery of each of example 1 and comparative example 1 at the 10th charge-discharge cycle at a temperature of 55° C. are as shown in Table 1 below.

TABLE 1

|  | Number of cycles | Charge capacity (mAh/g) of 10th round | Discharge capacity (mAh/g) of 10th round | IrReversibility Capacity (%) |
| --- | --- | --- | --- | --- |
| Example 1 | 10 | 325.96 | 324.03 | 0.59% |
| Comparative example 1 | 10 | 277.23 | 563.38 | −103% |

Test of Ionic Conductivity

The impedance variation of the electrolyte solution of each of example 1 and comparative example 1 was respectively measured with an AC impedance analyzer (Bio-Logic) at a constant voltage (5 mV) at temperatures of 40° C., 50° C., 60° C., and 70° C. Moreover, conductivity ((T) was calculated with equation (V).

$$\sigma = \frac{L}{RA}$$ equation (V)

In particular, L is the distance between two electrodes, A is the area of the electrodes, and R is the resistance value obtained by the AC impedance analyzer. In the present specification, L is 0.5 cm, and A is 1 $cm^2$.

<Experimental Results>

It can be known from FIG. 2 that, the battery discharge capacity of example 1 is about 315 mAh/g to about 320 mAh/g. The battery discharge capacity of comparative example 1 is about 560 mAh/g to about 570 mAh/g, and the value significantly exceeds the theoretical value (330 mAh/g). The reason is, damage to the structure of each of the cathode material and the isolation film from a Lewis acid occurs inside the lithium battery, thus causing the release of excess electrons. The situation also causes a sharp decline in the charge-discharge cycle life of the lithium battery. In comparison, the difference between the battery charge capacity and the battery discharge capacity of example 1 is not great, and therefore the lithium battery of example 1 has better structural stability and charge-discharge reversibility.

It can be known from Table 1 that, the charge capacity of the lithium battery of example 1 of the 10th round (325.96 mAh/g) is close to the theoretical value of 330 mAh/g, and the charge capacity of the lithium battery of comparative example 1 of the 10th round (277.23 mAh/g) is significantly lower than the theoretical value of 330 mAh/g. The reason is, a side reaction of pyrolysis occurs inside the lithium battery of comparative example 1, thus causing a sharp decline in charge capacity. Accordingly, the charge capacity of example 1 is clearly maintained. Moreover, the discharge capacity of the lithium battery of comparative example 1 of the 10th round (563.38 mAh/g) is significantly higher than the theoretical value of 330 mAh/g. The reason is, cracking of the cathode material occurs inside the lithium battery of comparative example 1, thus causing the release of excess electrons. Moreover, the irreversibility capacity of example 1 is significantly less than that of comparative example 1. It can therefore be known that, when the electrolyte composition contains lithium benzimidazole, the application of the lithium battery at high temperature can be facilitated.

Figure 3:
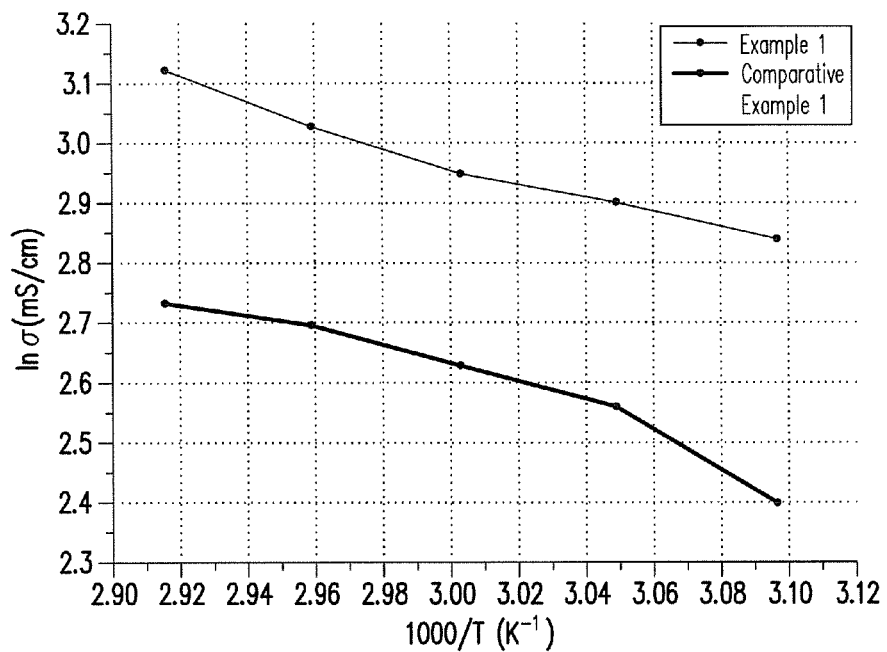
FIG. 3 illustrates a relationship diagram between ionic conductivity and temperature of a lithium battery of each of example 1 and comparative example 1 of the invention.

It can be known from FIG. 3 that, the ionic conductivity of example 1 is $1.7 \times 10^{-2}$ (S/cm) at 50° C., and the ionic conductivity of comparative example 1 is $1.1 \times 10^{-2}$ (S/cm) at 50° C. The results show that when the electrolyte composition contains lithium benzimidazole, the dissolution reaction of lithium hexafluorophosphate into a lithium ion can be more readily performed. Moreover, the power density of the lithium battery can be expected to significantly increase due to the addition of a benzimidazole anion.

Based on the above, the lithium battery fabricated according to the electrolyte composition containing a specific anion provided by the invention can effectively prevent the issue of damage to the cathode material and the isolation film from a by-product Lewis acid when operating at high temperature. As a result, the lithium battery has good structural stability, high battery efficiency, and longer charge-discharge cycle life, and can therefore be effectively applied in the engine environment of an electric vehicle.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. An electrolyte composition, comprising:
   a lithium salt (A);
   a benzimidazole compound (BP) represented by formula (I); and
   an organic solvent (C),

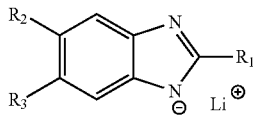

formula (I)

in formula (I), $R_1$, $R_2$, and $R_3$ each independently represent a hydrogen atom, a $C_1$ to $C_6$ alkyl group, a halogen atom, or —$CF_3$, wherein based on a total amount of 100 parts by weight of the organic solvent (C), a usage amount of the lithium salt (A) is 15 parts by weight to 30 parts by weight, and a usage amount of the benzimidazole compound (BP) is 12 parts by weight to 29 parts by weight.

2. The electrolyte composition of claim 1, wherein $R_1$, $R_2$, and $R_3$ represent a hydrogen atom.

3. The electrolyte composition of claim 1, wherein the lithium salt (A) is lithium hexafluorophosphate.

4. A lithium battery, comprising:
   an anode;
   a cathode disposed separately from the anode;
   two isolation films disposed between the anode and the cathode, wherein the two isolation films are separated by a distance, wherein the two isolation films, the anode, and the cathode define a housing region;
   an electrolyte composition disposed in the housing region, wherein the electrolyte composition is as described in claim 1; and
   a package structure covering the two isolation films, the anode, the cathode, and the electrolyte composition.

* * * * *